United States Patent [19]

Kelly

[11] 4,082,529
[45] Apr. 4, 1978

[54] GLASS BENDING PRESS WITH OFFSET HINGES

[75] Inventor: Joseph B. Kelly, Crestline, Ohio

[73] Assignee: PPG Industries, Inc., Pittsburgh, Pa.

[21] Appl. No.: 756,210

[22] Filed: Jan. 3, 1977

[51] Int. Cl.² .............................................. C03B 23/02
[52] U.S. Cl. ........................................ 65/273; 65/275; 65/289
[58] Field of Search ................ 65/104, 106, 103, 273, 65/275, 288, 289, 287

[56] References Cited

U.S. PATENT DOCUMENTS

| 3,251,672 | 5/1966 | Touvay et al. ........................ 65/291 |
| 3,290,133 | 12/1966 | Thomas .................................. 65/106 |
| 3,333,935 | 8/1967 | Valchar et al. ........................ 65/106 |
| 3,367,764 | 2/1968 | Seymour ................................. 65/291 |
| 3,682,613 | 8/1972 | Johnson et al. ........................ 65/89 |
| 3,837,833 | 9/1974 | Couture et al. ........................ 65/106 |
| 3,960,535 | 6/1976 | Hamilton et al. ...................... 65/104 |

FOREIGN PATENT DOCUMENTS

| 575,806 | 2/1958 | Belgium. |
| 799,907 | 11/1968 | Canada. |
| 900,720 | 5/1972 | Canada. |

Primary Examiner—Arthur D. Kellogg
Attorney, Agent, or Firm—Dennis G. Millman

[57] ABSTRACT

When bending glass sheets to a curvature including a line of sharp bending, damage to the glass surface caused by sliding of the glass relative to the press surfaces is reduced by employing a hinged shaping member having offset hinges.

3 Claims, 3 Drawing Figures

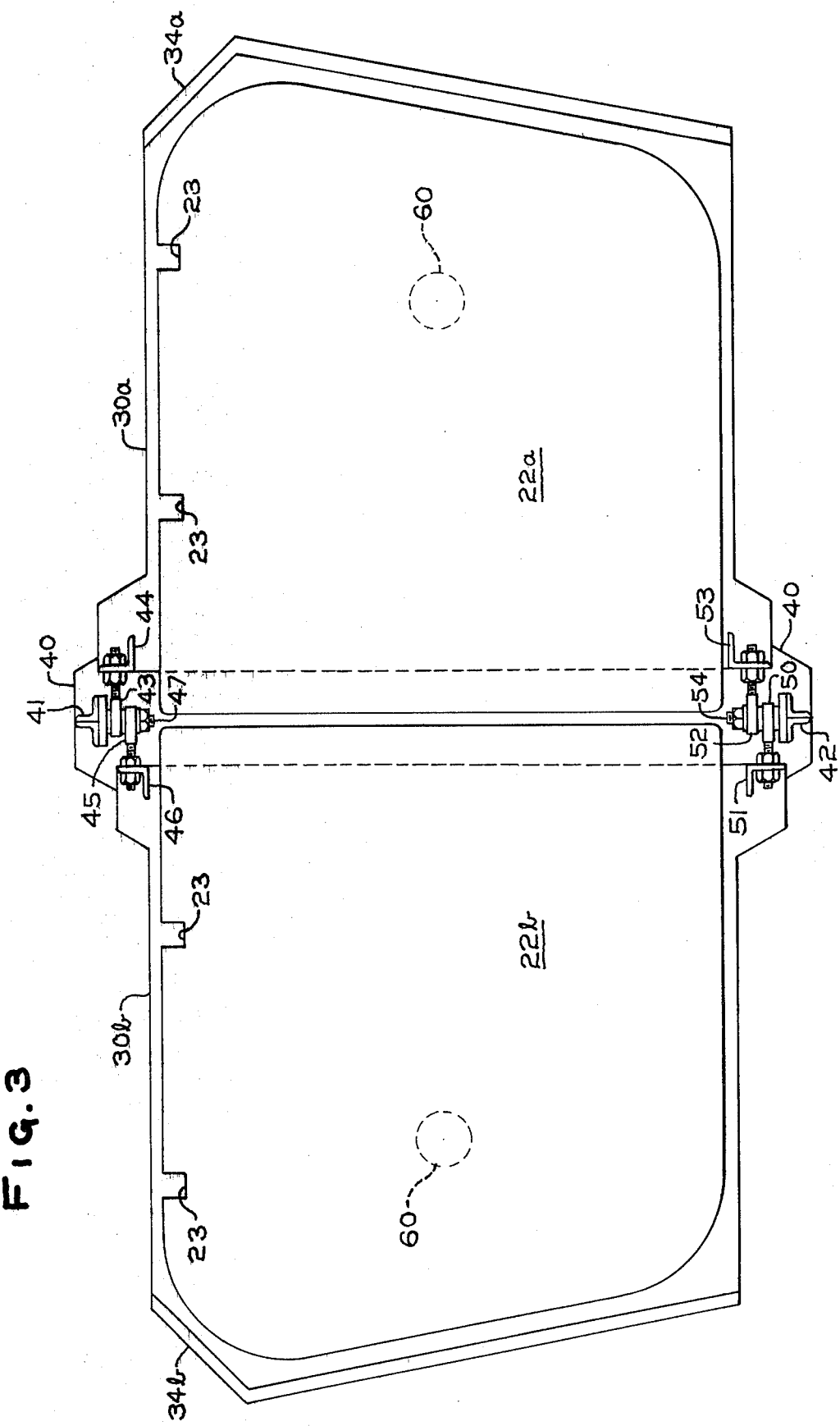

GLASS BENDING PRESS WITH OFFSET HINGES

BACKGROUND OF THE INVENTION

This invention relates to the shaping of heat-softened glass sheets or the like by pressing the sheets between two solid shaping members of complementary curvature, namely, a male shaping member of convex configuration and a female shaping member of concave configuration. This technique, known as press bending, lends itself to relatively inexpensive mass production of bent glass sheets within precise tolerances. More particularly, the invention relates to press bending glass sheets so as to produce bends of very sharp curvature known as "V" bends, wherein the female shaping member of concave configuration comprises two or more segments hinged together to rotate about an axis approximately coextensive with the line of sharp bending in the glass. While such a hinged shaping member avoids stretching the heat-softened glass sheets when making "V" bends, it is sometimes found nevertheless that the quality of the glass is impaired by scuffing of the soft glass surfaces caused by a slight slippage of the glass sheet relative to the shaping surfaces as the shape of the glass is transformed from planar to curved. This problem is usually encountered when making bends having a radius of curvature along one edge substantially different from the radius of curvature along the opposite edge.

Press bending in general is a well known technique for shaping glass sheets, a particularly advantageous example of which may be seen in U.S. Pat. No. 3,367,764 to S. L. Seymour. Hinged shaping members were also known in the prior art, such as those disclosed in U.S. Pat. No. 3,251,672 to Touvay et al.; U.S. Pat. No. 3,682,613 to Johnson et al.; and Belgian Pat. No. 575,806 to St. Gobain. Each of these prior art hinged presses, however, is hinged so as to place the axis of rotation parallel to and essentially contiguous with the overlying portion of the glass sheet being bent.

In another type of prior art process for bending glass sheets known as gravity sag bending, wherein glass sheets are supported on shaped outline rings as the glass is heated and sags by the force of gravity, it is known to use outline rings which have counterweighted sections that pivot upwardly as the glass sags. When fabricating such pivoted outline rings for the gravity sag bending process, it has been the practice to vary the locations of the pivot points for the counterweighted sections through a relatively wide range of locations in order to achieve the desired arc for the upward swinging motion. However, such a practice did not provide a teaching for how to reduce scuff mark defects when press bending glass sheets to form "V" bends.

SUMMARY OF THE INVENTION

The present invention reduces relative slippage between glass sheets and the faces of press bending molds when "V" bends are being formed, particularly in cases where the radius of curvature along one edge of the bent glass sheet is substantially different from the radius of curvature along the opposite edge. This is accomplished by locating the hinges pivotally connecting the segments of a jointed female shaping member along an axis that is angularly offset from the line of sharp bending defined by the shaping faces of the press members. The axis of rotation of said segments on said hinges is thereby rendered oblique to the "V" bend line in the glass and lies in a plane which is normal to the glass surface and intersects the glass along the "V" bend line. Thus, with the orientation of the shaping surfaces maintained unchanged, one of the hinges is relocated forwardly or rearwardly from the usual position in approximate alignment with the "V" bend line. The result is to change the pivoting action of the hinged female shaping member so as to more closely follow the movement of the glass sheet as it is being bent, thereby reducing relative sliding motion laterally between the glass sheet and the glass shaping surfaces so as to reduce the glass surface defects which normally accompany such motion.

THE DRAWINGS

FIG. 3 is an enlarged front view of the improved female shaping member of FIG. 1.

DETAILED DESCRIPTION

Figure 1:
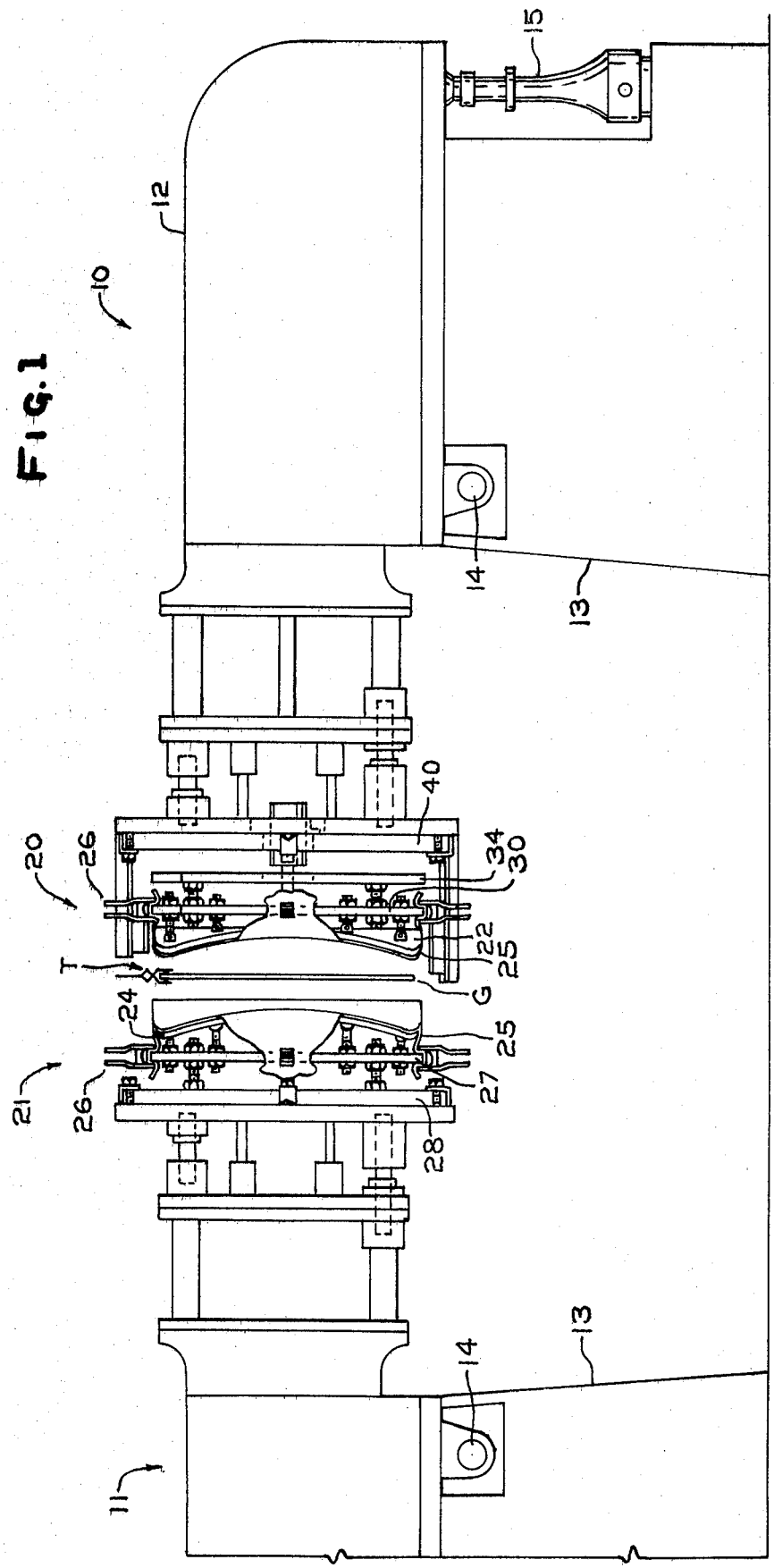
FIG. 1 is a fragmentary end view of a typical, vertically oriented press bending apparatus including a hinged female shaping member modified in accordance with the present invention.

The glass bending apparatus depicted in the drawings for the purpose of illustrating the invention is a preferred embodiment of a vertical press bending apparatus which, with the exception of the female shaping member, is substantially identical to that disclosed in U.S. Pat. No. 3,367,764 to S. L. Seymour, the disclosure of which is hereby incorporated by reference. Since the details of the construction and operation of the overall press bending apparatus may be obtained from that patent, only a brief summary need be set forth here in order to obtain an understanding of the present invention.

As shown in FIG. 1, a sheet of glass G, supported in a vertical orientation by tongs T gripping its upper edge portion, and having been heated to a softened condition suitable for bending, is stopped in a bending position between a pair of opposed presses 10 and 11. Each has a housing 12 which may be reciprocated relative to a base 13 in a generally horizontal direction, approximately normal to the plane of the glass sheet. Each housing 12 may be tilted slightly about a pivot 14 by means of a cylinder 15, which is sometimes found advantageous for reducing the pull of the tongs on the glass during pressing, as explained in greater detail in U.S. Pat. No. 3,290,133 of D. L. Thomas.

The presses 10 and 11 carry in opposed, facing relationship a female shaping member 20 and a male shaping member 21 respectively. Each shaping member includes an outwardly facing, relatively flexible shaping plate having the desired curvature for the glass, the female shaping member having a concave shaping plate 22, and the male shaping member having a convex shaping plate 24. The upper edge of each shaping plate includes a number of notches 23 (see FIG. 3) for receiving the tongs T when the presses close. The forward, glass-facing surfaces of both shaping plates 22 and 24 are covered with a material 25 which does not harm glass surfaces at elevated temperatures, such as stretchable fiber glass cloth made of texturized yarns. The cover 25 is held in place by a plurality of clamps 26. The male shaping member 21 further comprises a relatively rigid adjusting plate 27 and a relatively rigid back plate 28, while the female shaping member includes a relatively rigid adjusting plate 30 and a relatively rigid back plate 34. All three plates in each shaping member are adjustably fastened to the plate or plates adjacent thereto by means of a large number of threaded rods and nuts. As shown more clearly in the enlarged view of the female shaping member 20 in FIG. 2, each one of a plurality of threaded rods 31 is movably affixed at one end to adjusting plate 30 by means of nuts 32 and pivotally attached at the other end to the rear surface of shaping plate 22 that faces away from a glass sheet during press bending through a corresponding clevis 33. The clevises are fixed to the rear of shaping plate 22. Adjustments to the curvature of the shaping plate may be made by turning nuts 32. A plurality of threaded rods 35 and nuts 36 join adjusting plate 30 to back plate 34. Corresponding adjustment means are provided for the male shaping member 21.

The front view of the female shaping member 20 in FIG. 3 shows that the female shaping plate 22 is separated into a right-hand segment 20a and a left-hand segment 20b with the line of separation corresponding to the approximate location of the line of sharp bending. The adjusting plate 30 and the back plate 34 of the female shaping member 20 are also separated into right-hand segments (designated by the suffix "a" in FIG. 3) and left-hand segments (designated by the suffix "b" in FIG. 3), with all of the right-hand segments joined together to pivot as a unit independently from the left-hand segments and vice versa. Both pivoting units of the female shaping member are carried on a frame 40 between an upper bracket 41 and a lower bracket 42 which are attached to and extend forwardly from frame 40. Both brackets are depicted as being fabricated from a plate and two angle irons, but the brackets may, of course, take the form of any protruding structural members of suitable strength. The pivoting halves of the female shaping member 20 are provided with a hinged attachment to upper bracket 41 by means of a rod end bearing 43 attached to the right-hand adjusting plate 30a by way of a forwardly projecting lug 44. Similarly, another rod end bearing 45 is fastened to a lug 46 attached to the left-hand adjusting plate 30b. Bearings 43 and 45 are free to rotate about a pivot post 47 extending downwardly from upper bracket 41. Likewise, lower bracket 42 carries a hinge arrangement including a rod end bearing 50 affixed to the left-hand adjusting plate 30b by way of a lug 51, and a rod end bearing 52 joined to the right-hand adjusting plate 30a through a lug 53. Both bearings 50 and 52 are free to pivot about a post 54 extending upwardly from the lower bracket 42. The pivoting to the female shaping member halves from the open, flat position to the bent position may be aided by a pair of pneumatic cylinders 60 mounted on frame 40, each cylinder having a piston rod 61 affixed to any convenient point on the respective half of the shaping member.

Figure 2:
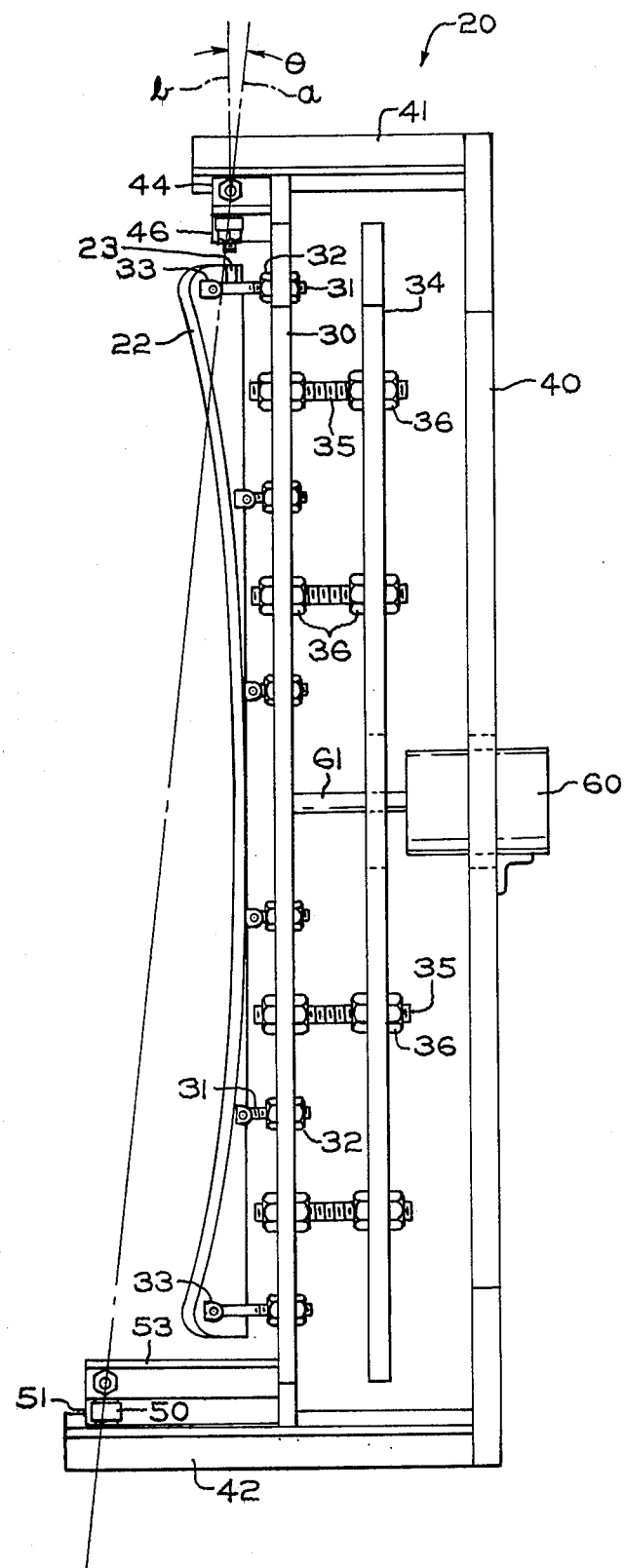
FIG. 2 is an enlarged end view of the improved hinged female shaping member of FIG. 1.

In FIG. 2 it can be seen that in the embodiment illustrated, the lower bracket 42 and lugs 51 and 53 are longer than their counterparts, namely, upper bracket 41 and lugs 44 and 46, at the upper end of the female shaping member, thereby placing the lower hinge point in front of the glass shaping surface. The upper hinge point is approximately aligned with the glass shaping surface, so that the line of rotation "A" forms an acute angle $\theta$ with the line of sharp bending "b" in a plane normal to the glass shaping surface at the line of sharp bending. The magnitude of angle $\theta$ will depend upon the particular shape being formed in the glass and the amount of relative slippage between the glass and the shaping surface, but typically an angle of only a few degrees will suffice. For example, if the radius of bending at the top of the glass sheet is smaller than the radius of bending at the bottom of the glass sheet, it may be found that the upper corners of the glass sheet move downwardly during pressing when the hinges are not offset. If the vertical slippage is on the order of $\frac{1}{2}$ inch (13 millimeters), it may be essentially eliminated by providing angle $\theta$ with a magnitude of about 2° to 3°. This may be effected by relocating the lower hinge point forwardly as shown in the drawings, or, alternatively, by moving the upper hinge point rearwardly, or a combination of both. When the smaller radius of curvature is at the bottom edge of the glass sheet, the bottom corners of the sheet may tend to slide upwardly, and the hinge axis must then be tilted in the opposite direction to overcome the slippage. That is, the upper hinge point should be located farther toward the front than the lower hinge point.

It should be understood that the invention is not limited to the specific embodiment which has been disclosed above for the purpose of illustrating the invention, but that various modifications and alternatives known to those of skill in the art may be resorted to without departing from the scope of the invention as defined by the appended claims.

I claim:

1. An apparatus for press bending heat-softened glass sheets to a curvature including a line of sharp bending, comprising:
    opposed male and female shaping members including opposed glass shaping surfaces of complementary curvature corresponding to the desired curvature for the glass sheets, the glass shaping surface of the male member having a protruding ridge defining a line of sharp bending flanked by areas on said male shaping surface of less severe curvature, the female shaping member including two segments, one on either side of a plane extending from said ridge on the male shaping surface and passing through the line of sharp bending in angular symmetry to said flanking areas on the male shaping surface, the two female segments being hinged together to rotate about an axis lying within said plane and obliquely intersecting the line of sharp bending, means to convey a heat-softened glass sheet into and out of a shaping station between said shaping surfaces and means to move the shaping members into and out of pressing engagement with a glass sheet in said shaping position so as to bend the glass sheet to the desired curvature.

2. The apparatus of claim 1 wherein each glass shaping surface has a radius of curvature which changes in the direction of said line of sharp bending.

3. The apparatus of claim 2 wherein the line of sharp bending extends in a generally vertical direction and the radius of curvature along the top portion of the shaping surfaces differs from the radius of curvature along the bottom portion of the shaping surfaces.

* * * * *